United States Patent
Tabuchi

(10) Patent No.: US 10,341,515 B2
(45) Date of Patent: Jul. 2, 2019

(54) IMAGE FORMING SYSTEM INCLUDING IMAGE FORMING APPARATUS AND POSTPROCESSING DEVICE, AND IMAGE FORMING APPARATUS AND POSTPROCESSING DEVICE AVAILABLE FOR IMAGE FORMING SYSTEM

(71) Applicant: Kyocera Document Solutions Inc., Osaka (JP)

(72) Inventor: Hidehiro Tabuchi, Osaka (JP)

(73) Assignee: Kyocera Document Solutions Inc., Osaka (JP)

( * ) Notice: Subject to any disclaimer, the term of this patent is extended or adjusted under 35 U.S.C. 154(b) by 0 days.

(21) Appl. No.: 16/016,598

(22) Filed: Jun. 23, 2018

(65) Prior Publication Data

US 2018/0376017 A1    Dec. 27, 2018

(30) Foreign Application Priority Data

Jun. 23, 2017    (JP) ................. 2017-123026

(51) Int. Cl.
    H04N 1/00    (2006.01)
(52) U.S. Cl.
    CPC ....... H04N 1/00588 (2013.01); H04N 1/0062 (2013.01)
(58) Field of Classification Search
    USPC ....................................... 358/1.15
    See application file for complete search history.

(56) References Cited

U.S. PATENT DOCUMENTS

2015/0071674 A1*  3/2015  Ichihashi ........... G03G 15/6582
                                                                        399/82
2018/0067702 A1*  3/2018  Iida ....................... G06F 3/1255

FOREIGN PATENT DOCUMENTS

JP    2004-249638 A    9/2004

* cited by examiner

Primary Examiner — Henok Shiferaw
Assistant Examiner — Darryl V Dottin
(74) Attorney, Agent, or Firm — HEA Law PLLC

(57) ABSTRACT

An image forming system includes an image forming apparatus and a postprocessing device. The image forming apparatus includes a first communication unit, a paper feeder, and a first control unit. The postprocessing device includes a second communication unit, a postprocessing unit, and a second control unit. The second control unit obtains a first time to perform the postprocessing and a second time to transition to a performable state configured to perform the postprocessing. The first control unit obtains attribute information necessary for the second control unit to obtain the first time and the second time. When the second communication unit receives the attribute information, the second control unit transmits information indicating the first time and the second time. The first control unit controls the operation of the paper feeder based on the information indicating the first time and the second time received by the first communication unit.

9 Claims, 9 Drawing Sheets

IMAGE FORMING SYSTEM INCLUDING IMAGE FORMING APPARATUS AND POSTPROCESSING DEVICE, AND IMAGE FORMING APPARATUS AND POSTPROCESSING DEVICE AVAILABLE FOR IMAGE FORMING SYSTEM

INCORPORATION BY REFERENCE

This application is based upon, and claims the benefit of priority from, corresponding Japanese Patent Application No. 2017-123026 filed in the Japan Patent Office on Jun. 23, 2017, the entire contents of which are incorporated herein by reference.

BACKGROUND

Unless otherwise indicated herein, the description in this section is not prior art to the claims in this application and is not admitted to be prior art by inclusion in this section.

It has been proposed that an image forming apparatus configured to perform postprocessing on recording sheets on which image formations have been performed in a plurality of different modes. This image forming apparatus includes an image formation control unit and a communication unit. The image formation control unit controls operation of respective units of the image forming apparatus. The communication unit communicates with a postprocessing device connected to the image forming apparatus. The postprocessing device performs a staple process and a matching process on the recording sheets as the postprocessing. The image formation control unit communicates with the postprocessing device after the mode of the postprocessing is changed, thus determining whether initialization of the postprocessing device is necessary or not. The image formation control unit calculates an initialization time when the initialization is determined to be necessary. The image formation control unit controls an image forming operation based on the calculated initialization time and a preliminarily determined reference time.

SUMMARY

An image forming system according to one aspect of the disclosure includes an image forming apparatus and a postprocessing device. The image forming apparatus performs an image formation process to form images on a plurality of sheets based on an execution request of a job. The postprocessing device is connected to the image forming apparatus. The plurality of sheets are conveyed one by one from the image forming apparatus to the postprocessing device. The image forming apparatus includes a first communication unit, a paper feeder, and a first control unit. The first communication unit communicates with the postprocessing device. The paper feeder houses the plurality of sheets to feed the housed plurality of sheets one by one. The first control unit controls operation of the first communication unit and the paper feeder. The postprocessing device includes a second communication unit, a postprocessing unit, and a second control unit. The second communication unit communicates with the first communication unit. The postprocessing unit performs postprocessing on the sheets. The second control unit controls operation of the second communication unit and the postprocessing unit. The second control unit obtains a first time to perform the postprocessing and a second time to transition to a performable state configured to perform the postprocessing. The first control unit obtains attribute information necessary for the second control unit to obtain the first time and the second time. The first control unit transmits the attribute information corresponding to a first feeding sheet to the second communication unit via the first communication unit. The first feeding sheet is the sheet as a feed target of the paper feeder. When the second communication unit receives the attribute information, the second control unit transmits information indicating the first time and the second time to the first communication unit via the second communication unit. The first control unit controls the operation of the paper feeder based on the information indicating the first time and the second time received by the first communication unit.

These as well as other aspects, advantages, and alternatives will become apparent to those of ordinary skill in the art by reading the following detailed description with reference where appropriate to the accompanying drawings. Further, it should be understood that the description provided in this summary section and elsewhere in this document is intended to illustrate the claimed subject matter by way of example and not by way of limitation.

DETAILED DESCRIPTION

Figure 1:
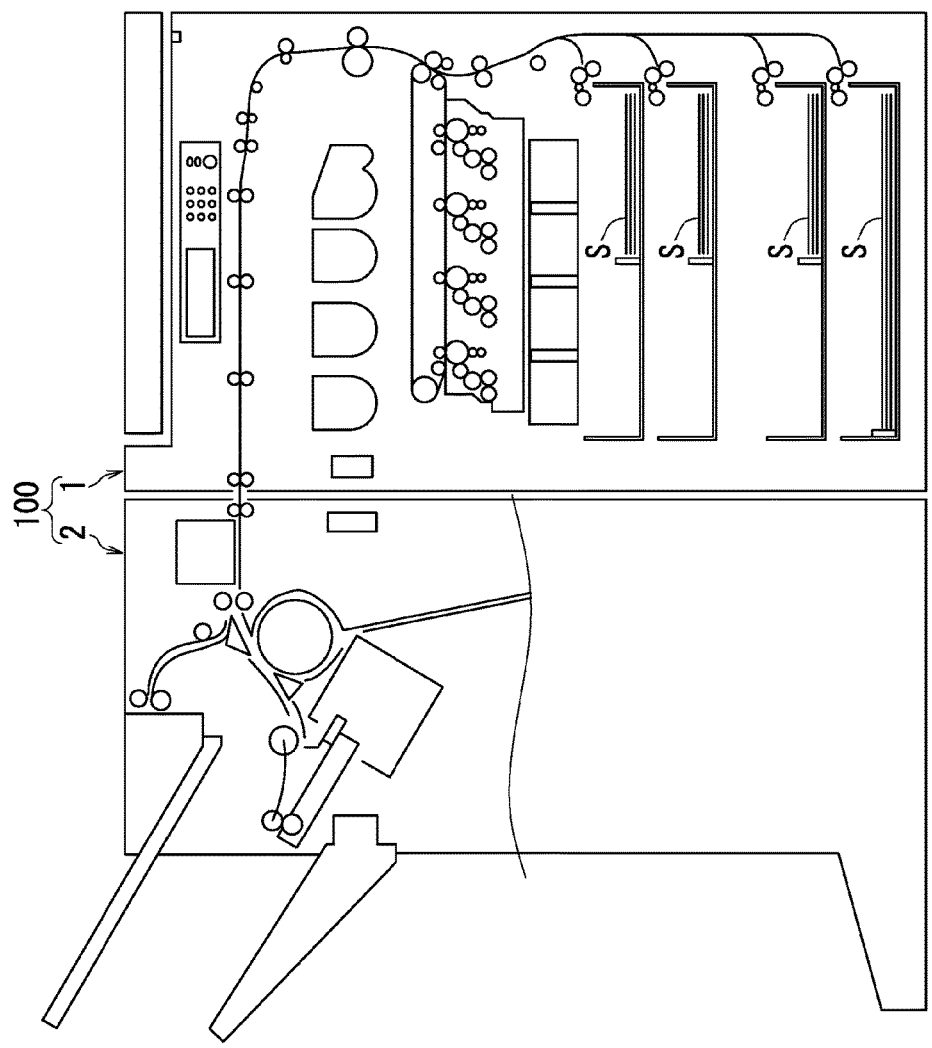
FIG. 1 illustrates an image forming system according to Embodiment 1 of the disclosure.

Example apparatuses are described herein. Other example embodiments or features may further be utilized, and other changes may be made, without departing from the spirit or scope of the subject matter presented herein. In the following detailed description, reference is made to the accompanying drawings, which form a part thereof.

The example embodiments described herein are not meant to be limiting. It will be readily understood that the aspects of the present disclosure, as generally described herein, and illustrated in the drawings, can be arranged, substituted, combined, separated, and designed in a wide variety of different configurations, all of which are explicitly contemplated herein.

The following describes embodiments of an image forming system, an image forming apparatus, and a postprocessing device according to the disclosure with reference to the drawings. In the drawings, identical reference numerals are used to the identical or corresponding parts not to repeat explanations.

Embodiment 1

First, a description will be given of an image forming system 100 according to an embodiment of the disclosure with reference to FIG. 1. FIG. 1 illustrates the image forming system 100 according to Embodiment 1.

As illustrated in FIG. 1, the image forming system 100 includes an image forming apparatus 1, and a postprocessing device 2 connected to the image forming apparatus 1. In this embodiment, the image forming apparatus 1 is a multi-functional peripheral.

The image forming apparatus 1 performs an image formation process. In this embodiment, the image formation process is a process to form images on a plurality of sheets S based on an execution request of a job. The image forming apparatus 1 conveys the sheets S one by one to the postprocessing device 2 after the image formation process.

The postprocessing device 2 performs postprocessing such as a punching process, a staple process, a matching process, and a shifting process on the sheet S conveyed from the image forming apparatus 1. In this embodiment, the postprocessing device 2 is configured to communicate with the image forming apparatus 1 after connecting to the image forming apparatus 1. The image forming system 100 can control a timing to convey the sheet S from the image forming apparatus 1 to the postprocessing device 2 such that communication is performed between the image forming apparatus 1 and the postprocessing device 2.

Figure 2:
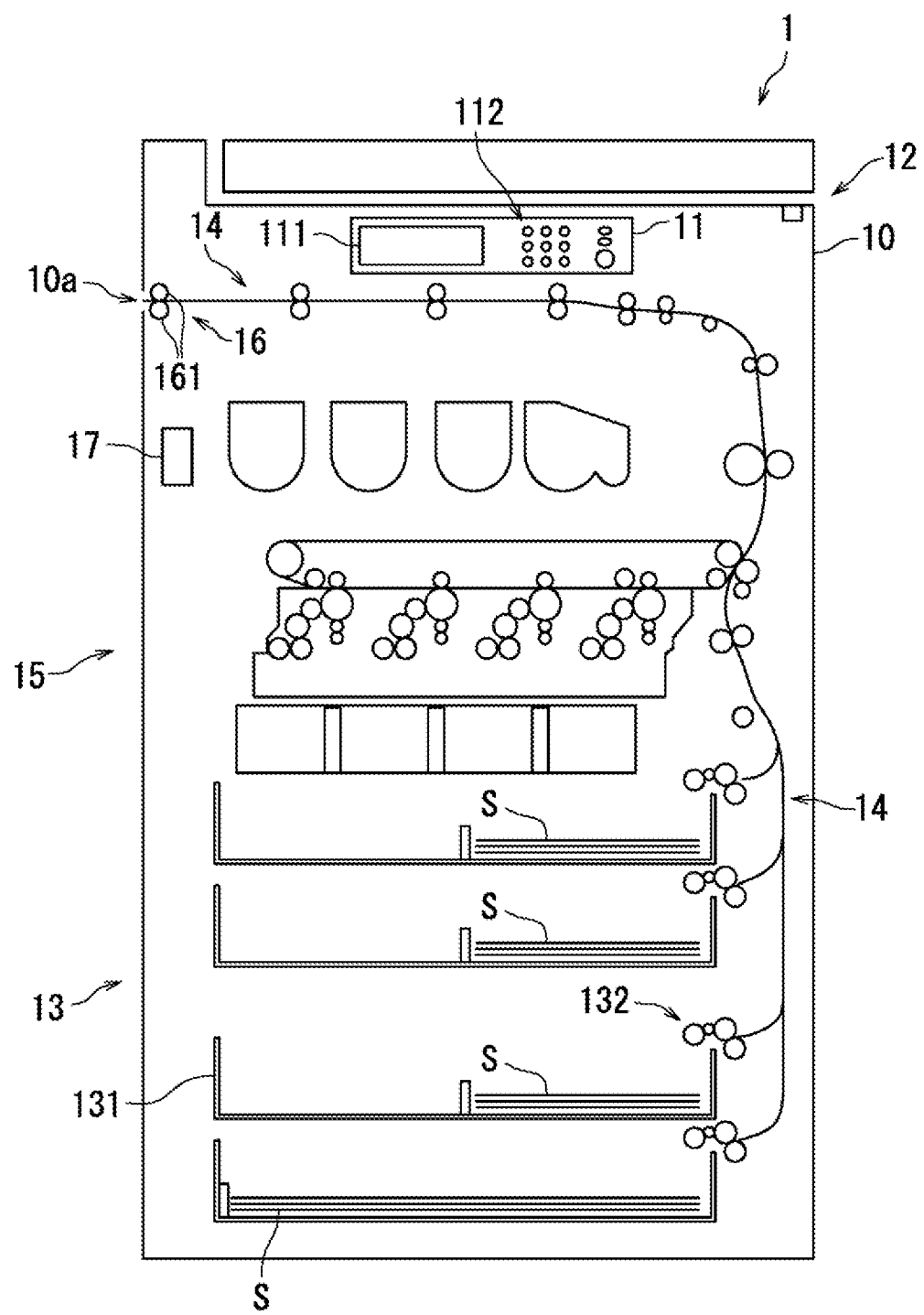
FIG. 2 illustrates a configuration of an image forming apparatus according to Embodiment 1.

Subsequently, a description will be given of a configuration of the image forming apparatus 1 according to Embodiment 1 with reference to FIG. 2. FIG. 2 illustrates the configuration of the image forming apparatus 1 according to Embodiment 1. The image forming apparatus 1 includes a first housing 10, an operation unit 11, a scanner 12, a paper feeder 13, a first conveying unit 14, an image forming unit 15, a main body discharge unit 16, and a first control unit 17. The operation unit 11 is an exemplary input apparatus.

The operation unit 11 accepts an instruction (input) from a user. The operation unit 11 transmits a signal indicating the instruction from the user to the first control unit 17 after accepting the instruction from the user.

The operation unit 11 includes a liquid crystal display 111 and a plurality of operation keys 112. The liquid crystal display 111 displays, for example, various process results. The operation key 112 includes, for example, a numeric keypad and a start key. In this embodiment, the user can request the image forming system 100 to execute the job by operating the operation unit 11. The user specifies a size of the sheet S that will be an execution target of the job, the number of copies, and a type of the postprocessing performed by the postprocessing device 2, at the time of the job execution request.

The scanner 12 reads the image of an original document to generate image data of the original document. The generated image data of the original document is transmitted to the first control unit 17.

The paper feeder 13 feeds the sheets S one by one to the first conveying unit 14. The paper feeder 13 includes four cassettes 131 and four feed roller groups 132. The respective cassettes 131 house a plurality of sheets S. The respective feed roller groups 132 are located on corresponding cassettes 131. The respective feed roller groups 132 feed the sheets S housed in the corresponding cassettes 131 one by one to the first conveying unit 14.

The first conveying unit 14 includes a conveyance roller pair and a guiding member. The first conveying unit 14 extends from the paper feeder 13 to the main body discharge unit 16, and conveys the sheet S fed from the cassette 131 to the main body discharge unit 16 via the image forming unit 15.

The image forming unit 15 forms the image on the sheet S based on the image data. In this embodiment, the image forming unit 15 forms the image on the sheet S in an electrophotographic method. For details, the image forming unit 15 includes, for example, an exposure apparatus, a charging apparatus, a photoreceptor drum, a developing device, a transfer apparatus, and a fixing unit.

The main body discharge unit 16 conveys the sheet S toward the postprocessing device 2 described with reference to FIG. 1. For details, the main body discharge unit 16 includes an apparatus discharge roller pair 161. The apparatus discharge roller pair 161 conveys the sheet S toward the postprocessing device 2 via a sheet discharge port 10a. The sheet discharge port 10a is formed on a side surface of the first housing 10 of the image forming apparatus 1.

The first control unit 17 includes a processor such as a central processing unit (CPU). The first control unit 17 includes an integrated circuit for image formation process. The integrated circuit for image formation process is constituted of an application specific integrated circuit (ASIC). The first control unit 17 controls the operation of the respective units included in the image forming apparatus 1. In this embodiment, the first control unit 17 performs a pre-communication process and a timing process.

Figure 3:
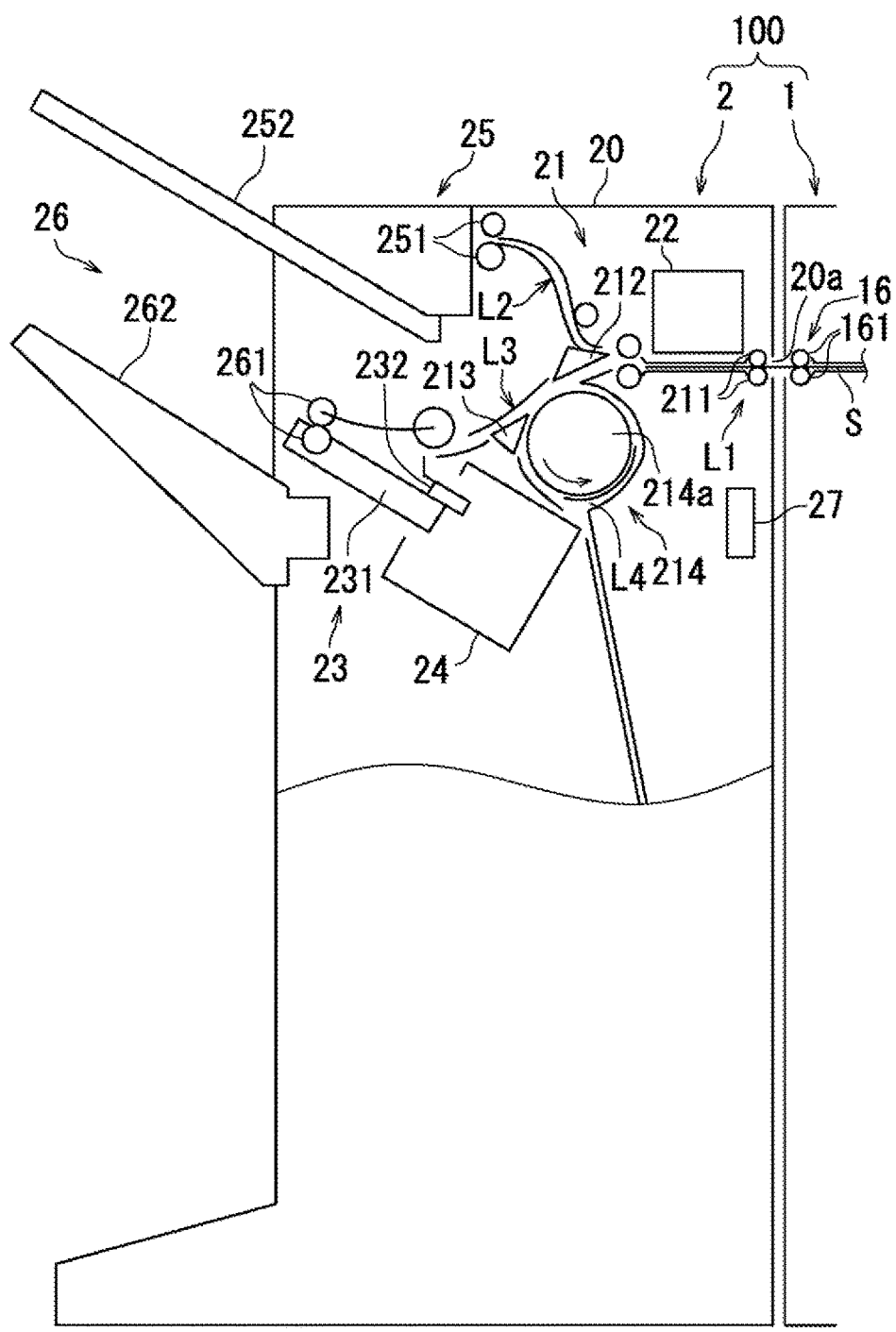
FIG. 3 illustrates a configuration of a postprocessing device according to Embodiment 1.

The following describes a configuration the postprocessing device 2 according to Embodiment 1 with reference to FIG. 3. FIG. 3 illustrates the configuration of the postprocessing device 2 according to Embodiment 1. The postprocessing device 2 includes a second housing 20, a second conveying unit 21, a puncher 22, a matching unit 23, a stapler 24, a first discharge unit 25, a second discharge unit 26, and a second control unit 27. The puncher 22, the matching unit 23, and the stapler 24 are exemplary postprocessing units.

As illustrated in FIG. 3, a sheet carry-in port 20a is formed on a side surface faced to the image forming apparatus 1 of the second housing 20. The sheet carry-in port 20a is faced to the sheet discharge port 10a of the image forming apparatus 1 described with reference to FIG. 2.

The postprocessing device 2 performs the postprocessing on the sheet S conveyed to the sheet carry-in port 20a.

The second conveying unit 21 conveys the sheet S from the sheet carry-in port 20a to the first discharge unit 25. Alternatively, the second conveying unit 21 conveys the sheet S from the sheet carry-in port 20a to the second discharge unit 26. For details, the second conveying unit 21 includes a plurality of conveyance roller pairs and a plurality of guiding members. The second conveying unit 21 includes a first conveyance path L1, a second conveyance path L2, and a third conveyance path L3. Specifically, the second conveying unit 21 includes a conveyance roller pair 211, a first switching member 212, a second switching member 213, and a save unit 214. The first conveyance path L1 extends from the sheet carry-in port 20a to the first switching member 212. The second conveyance path L2 extends from the first switching member 212 to the first discharge unit 25. The third conveyance path L3 extends from the first switching member 212 to the second discharge unit 26.

The conveyance roller pair 211 conveys the sheet S carried in the sheet carry-in port 20a toward the first discharge unit 25 or the second discharge unit 26 via the puncher 22.

The first switching member 212 is turnable. The first switching member 212 turns to switch a conveyance destination of the sheet S between the first discharge unit 25 and the matching unit 23 (the second discharge unit 26). For details, the first switching member 212 switches the conveyance destination of the sheet S so that the sheet S on which the matching process is not performed by the matching unit 23 is conveyed toward the first discharge unit 25 and the sheet S on which the matching process is performed by the matching unit 23 is conveyed toward the matching unit 23.

The second switching member 213 is turnable. The second switching member 213 turns to switch the conveyance destination of the sheet S between the matching unit 23 and the save unit 214. For details, the second switching member 213 switches the conveyance destination of the sheet S so that the sheet S necessary to be saved is conveyed to the save unit 214 and the sheet S unnecessary to be saved is conveyed toward the matching unit 23.

The puncher 22 performs the punching process that punches a hole in the sheet S. The puncher 22 has a hole punching member. The hole punching member waits at a first initial position when the punching process is not performed. The second control unit 27 moves the hole punching member from the first initial position to a first performing position when the punching process is performed. The first performing position varies corresponding to the size of the sheet S.

The matching unit 23 matches ends of a bundle of the sheets S (the plurality of sheets S). The matching unit 23 includes a process tray 231, a regulating member 232, a paddle, and a matching cursor. The process tray 231 has a placement surface. The placement surface is inclined downward from the second discharge unit 26 toward the stapler 24. The sheet S placed on the placement surface moves toward the regulating member 232 by its own weight. Further, the sheet S placed on the placement surface is transmitted toward a side of the regulating member 232 by the paddle. As a result, one end of the sheet S abuts on the regulating member 232. This aligns the one ends of the bundle of the sheets S stacked on the process tray 231. The following describes an end at the regulating member 232 side as a "rear end" and an end at the opposite side as a "front end" of the ends of the bundle of the sheets S placed on the placement surface. The sheets S conveyed via the third conveyance path L3 are stacked on the placement surface of the process tray 231.

The matching cursor performs the matching process to match the bundle of the sheets S stacked on the process tray 231. The matching cursor aligns the ends in a lateral direction (a direction perpendicular to a front-rear direction) of the bundle of the sheets S. In this embodiment, the matching unit 23 performs the matching process each time the sheet S is placed on the process tray 231.

The matching cursor waits at a second initial position when not performing the matching process. The second control unit 27 moves the matching cursor from the second initial position to a standby position when the matching process is performed. The standby position varies corresponding to the size of the sheet S.

The second control unit 27 moves the matching cursor by a predetermined amount in the lateral direction when the shifting process is performed. As a result, the position of the sheets S or the bundle of the sheets S stacked on the process tray 231 is shifted by the predetermined amount in the lateral direction.

The stapler 24 performs the staple process on the plurality of sheets S (the bundle of the sheets S) on which the matching process has been performed.

The stapler 24 waits at a third initial position when not performing the staple process. The second control unit 27 moves the stapler 24 from the third initial position to a second performing position when the staple process is performed. The second performing position varies corresponding to the size of the sheet S.

The first discharge unit 25 discharges the sheet S to an outside of the second housing 20 (the postprocessing device 2). Specifically, the first discharge unit 25 includes a first discharge roller pair 251 and a first discharge tray 252. The first discharge roller pair 251 discharges the sheet S to the first discharge tray 252.

The second discharge unit 26 discharges the sheet S or the bundle of the sheets S to the outside of the second housing 20 (the postprocessing device 2). Specifically, the second discharge unit 26 includes a second discharge roller pair 261 and a second discharge tray 262. The second discharge roller pair 261 discharges the sheet S or the bundle of the sheets S on which the shifting process has been performed by the matching unit 23 to the second discharge tray 262. Alternatively, the second discharge roller pair 261 discharges the bundle of the sheets S on which the staple process has been performed by the stapler 24 to the second discharge tray 262.

The save unit 214 temporarily saves the sheet S. The save unit 214 adjusts a conveyance timing of the sheet S to the matching unit 23. The save unit 214 includes a save drum 214a, a guiding member, and a plurality of rollers. The save drum 214a, the guiding member, and the plurality of rollers constitute a save conveyance path L4. The guiding member is arranged so as to surround a circumference surface of the save drum 214a. As a result, the save conveyance path L4 is constituted along the circumference surface of the save drum 214a. The sheet S is carried in the save conveyance path L4 from the third conveyance path L3 such that the second switching member 213 turns.

The save drum 214a winds the sheet S carried in the save conveyance path L4 around the circumference surface of the save drum 214a. The save drum 214a stacks the plurality of sheets S carried in the save conveyance path L4 to make the bundle of the sheets S. The bundle of the sheets S made by the save drum 214a is conveyed to the matching unit 23 via the third conveyance path L3.

The second control unit 27 is constituted of a processor such as a CPU. The second control unit 27 controls operation of the respective units included in the postprocessing device 2.

Figure 4:
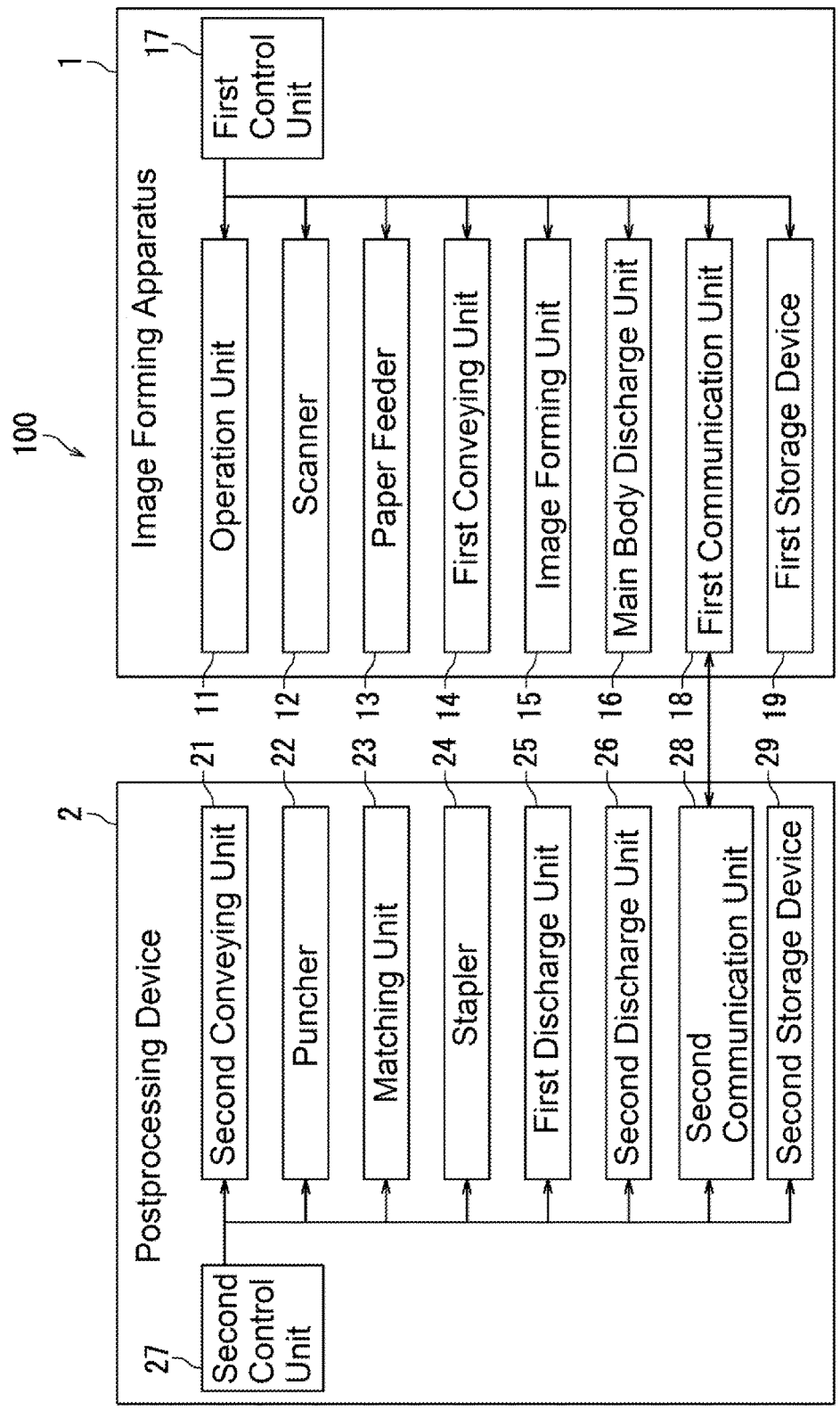
FIG. 4 illustrates a configuration of the image forming system according to Embodiment 1.

Then, a description will be given of a configuration of the image forming system 100 according to Embodiment 1 with reference to FIG. 4. FIG. 4 illustrates the configuration of the image forming system 100 according to Embodiment 1.

As illustrated in FIG. 4, the image forming apparatus 1 further includes a first communication unit 18 and a first storage device 19. The postprocessing device 2 further includes a second communication unit 28 and a second storage device 29.

The first communication unit 18 is a communication device that communicates in a communication method identical to that of the second communication unit 28. In this embodiment, the first communication unit 18 performs serial communication with the second communication unit 28.

The first storage device 19 is constituted of a storage device and/or a semiconductor memory. The storage device is constituted of, for example, a hard disk drive (HDD) and/or a solid-state drive (SSD). The semiconductor memory constitutes, for example, a random-access memory (RAM) and a read-only memory (ROM).

The first storage device 19 stores a first control program to control the operation of the respective units of the image forming apparatus 1. The first control program is executed by the first control unit 17.

The second communication unit 28 is a communication device that communicates in the communication method identical to that of the first communication unit 18.

The second storage device 29 is constituted of a storage device and/or a semiconductor memory. The storage device is constituted of, for example, an HDD and/or an SSD. The semiconductor memory constitutes, for example, a RAM and a ROM. The second storage device 29 stores a second control program to control the operation of the respective units of the postprocessing device 2. The second control program is executed by the second control unit 27.

In this embodiment, the first control unit 17 receives the signal indicating the job execution request from the operation unit 11 to start the pre-communication process and start the timing process. The communication between the first control unit 17 and the second control unit 27 is performed via the first communication unit 18 and the second communication unit 28.

The following describes the pre-communication process according to Embodiment 1 with reference to FIGS. 5 to 9. In FIGS. 5 to 9, information transmitted from the first control unit 17 to the second control unit 27 is indicated by an arrow with the solid line, and information transmitted from the second control unit 27 to the first control unit 17 is indicated by an arrow with the dashed line.

Figure 5:
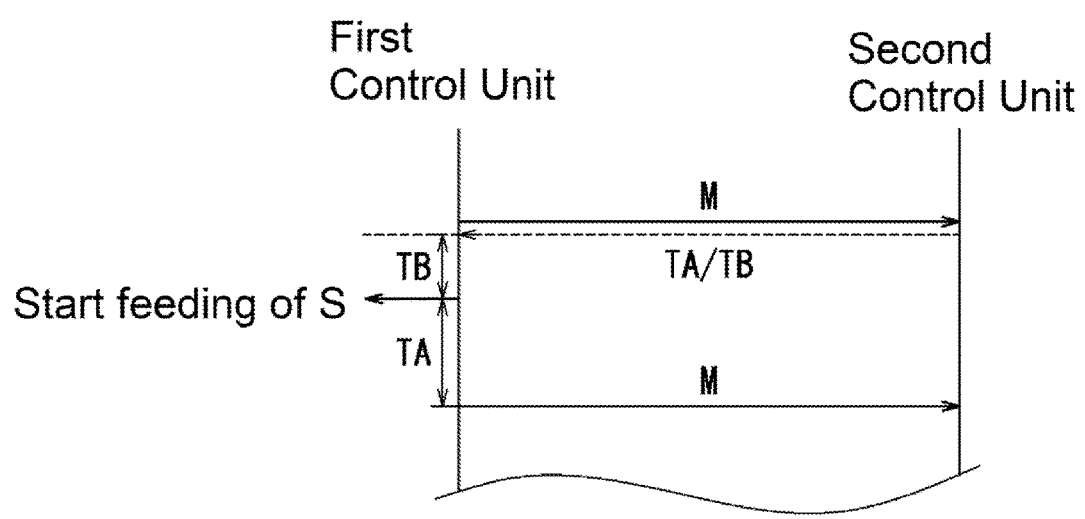
FIG. 5 illustrates a basic sequence of a pre-communication process according to Embodiment 1.

First, a description will be given of a basic sequence of the pre-communication process according to Embodiment 1 with reference to FIG. 5. FIG. 5 illustrates the basic sequence of the pre-communication process according to Embodiment 1.

As illustrated in FIG. 5, the first control unit 17 transmits attribute information M corresponding to the sheet S that is a feeding target to the second control unit 27 before feeding the sheet S. Specifically, the attribute information M is transmitted before the sheet S is fed from the cassette 131 by the feed roller group 132.

The attribute information M indicates size information, postprocessing information, and last sheet information. The size information indicates the size of the sheet S. The postprocessing information indicates the type of the postprocessing performed on the sheet S. The last sheet information indicates whether the sheet S is the last sheet S or not. For details, the last sheet information indicates whether the feeding target sheet S is the last sheet S on which the postprocessing is performed corresponding to a certain job or not. Alternatively, when a value indicating the number of copies is two or more, the last sheet information indicates whether the feeding target sheet S is the last sheet S among the plurality of sheets S included in each of the copies or not.

The second control unit 27 obtains an intercopy/intersheet time TA and a correction time TB based on the attribute information M. The intercopy/intersheet time TA is an exemplary first time. The correction time TB is an exemplary second time.

The intercopy/intersheet time TA indicates a time to perform the postprocessing on the sheet S. In this embodiment, the intercopy/intersheet time TA indicates a total time (an intersheet time) of a pulling-in time and a matching processing time, for example, when the postprocessing for the sheet S is the staple process or the shifting process. The pulling-in time indicates a time to transmit the sheet S to the regulating member 232 side by the paddle on the process tray 231. The matching processing time indicates a time to match the ends in the lateral direction of the sheets S by the matching cursor. Alternatively, the intercopy/intersheet time TA indicates a total time (an intercopy time) of the pulling-in time, the matching processing time, a staple processing time, and a discharge processing time when the postprocessing for the sheet S is the staple process. The staple processing time indicates a time to perform the staple process on the bundle of the sheets S after the matching process. The discharge processing time indicates a time to discharge the bundle of the sheets S to the second discharge tray 262. Alternatively, the intercopy/intersheet time TA indicates a total time (an intercopy time) of the pulling-in time, the matching processing time, a shifting processing time to perform the shifting process on the bundle of the sheets S after the matching process, and the discharge processing time when the postprocessing for the sheet S is the shifting process. Alternatively, the intercopy/intersheet time TA indicates a punching processing time (an intersheet time) to perform the punching process when the postprocessing for the sheet S is the punching process.

The second control unit 27 calculates the intercopy/intersheet time TA based on the size information, the postprocessing information, and the last sheet information. Alternatively, the second control unit 27 obtains the intercopy/intersheet time TA with reference to a table stored in the second storage device 29.

The correction time TB indicates a time to cause a state of the postprocessing device 2 to transition to a state configured to perform the postprocessing (a performable state).

The second control unit 27 obtains the correction time TB based on the attribute information M corresponding to the sheet S fed before (hereinafter referred to as a "preceding sheet S") and the attribute information M corresponding to the sheet S to be fed next (hereinafter referred to as a "following sheet S") among the sheets S continuously fed from the cassette 131 by the feed roller group 132. For details, the second control unit 27 determines whether the size information corresponding to the preceding sheet S matches the size information corresponding to the following sheet S or not. The second control unit 27 determines whether the postprocessing information corresponding to the preceding sheet S matches the postprocessing information corresponding to the following sheet S or not. The second control unit 27 determines that the correction time TB is "0" seconds when it is determined that the size information corresponding to the preceding sheet S matches the size information corresponding to the following sheet S and it is determined that the postprocessing information corresponding to the preceding sheet S matches the postprocessing information corresponding to the following sheet S. On the other hand, the second control unit 27 calculates the correction time TB when it is determined that the size information corresponding to the preceding sheet S does not match the size information corresponding to the following sheet S or that the postprocessing information corresponding to the preceding sheet S does not match the postprocessing information corresponding to the following sheet S. For example, the second control unit 27 calculates the correction time TB based on the size information and the postprocessing information of the respective preceding sheet S and following sheet S. Alternatively, the second control unit 27 may obtain the correction time TB with reference to the table stored in the second storage device 29. The preceding sheet S is an exemplary first feeding sheet. The following sheet S is an exemplary second feeding sheet.

For example, when the type of the postprocessing is the shifting process or the staple process, the second control unit 27 varies the position of the matching cursor corresponding to the size of the sheet S when it is determined that the sizes do not match between the preceding sheet S and the following sheet S. In this time, the correction time TB indicates a time to vary the standby position of the matching cursor corresponding to the variation of the size of the sheet S. When the type of the postprocessing is the punching process, the correction time TB indicates a time to vary the first performing position of the hole punching member of the puncher 22 corresponding to the variation of the size of the sheet S.

When the job includes a plurality of copies, the second control unit 27 obtains the correction time TB when it is determined that the types of the postprocessing do not match between a preceding copy and a following copy (the preceding copy and the next copy). In this case, the correction time TB indicates a time to cause states of the respective units (for example, the puncher 22, the matching unit 23, and the stapler 24) of the postprocessing device 2 to transition from a state configured to perform the postprocessing for the preceding copy to a state configured to perform the postprocessing for the following copy.

The second control unit 27 obtains the intercopy/intersheet time TA and the correction time TB to transmit information indicating the obtained intercopy/intersheet time TA and correction time TB to the first control unit 17.

The first control unit 17 receives the information indicating the intercopy/intersheet time TA and the correction time TB from the second control unit 27 to wait until when the correction time TB has passed. The first control unit 17 causes the feed roller group 132 to start the feeding of the sheet S after the correction time TB has passed from the reception of the intercopy/intersheet time TA and the correction time TB. As a result, one sheet S is fed from the cassette 131.

The first control unit 17 transmits the attribute information M corresponding to the sheet S to be fed from the cassette 131 next to the second control unit 27 after the intercopy/intersheet time TA has passed from the start of the feeding operation of the sheet S. After that, similarly, until when the job ends, the communication between the second control unit 27 and the first control unit 17 is performed.

Figure 6:
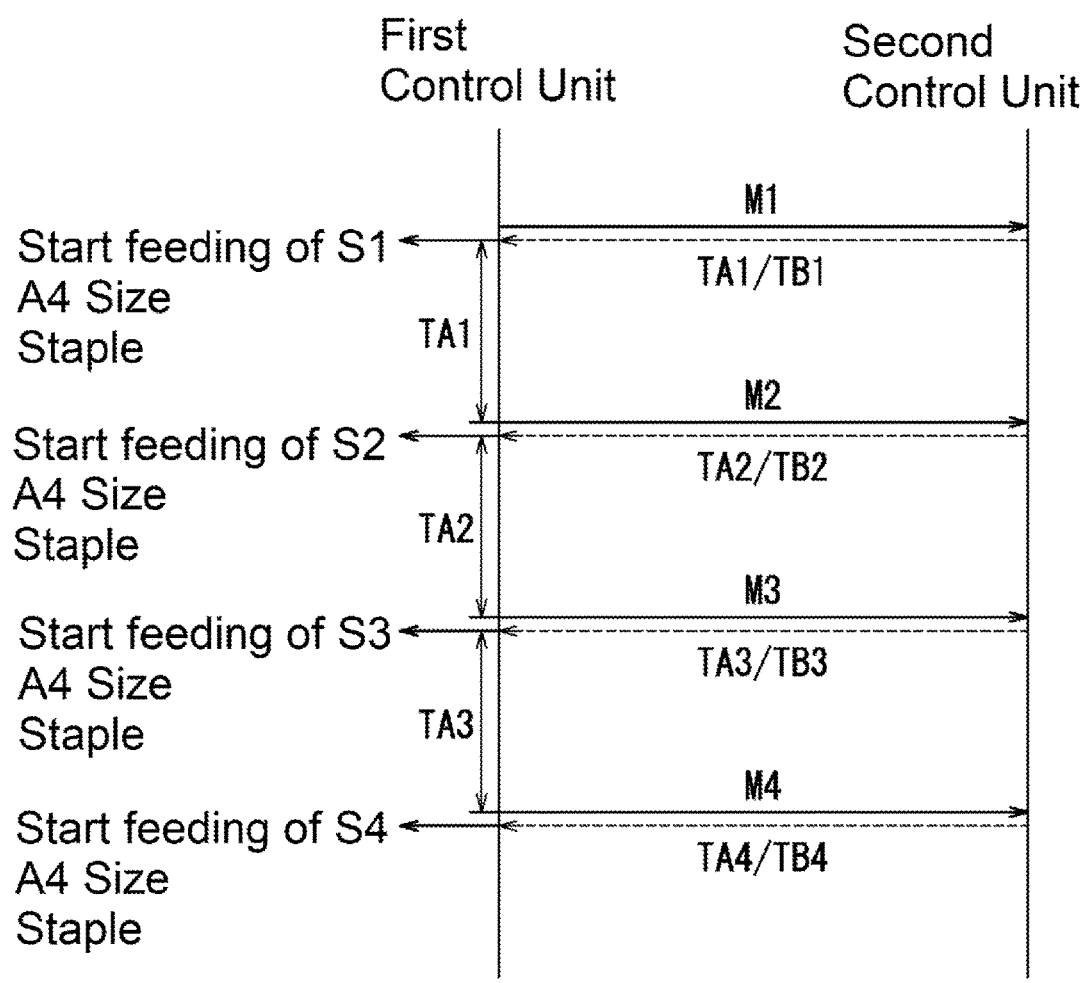
FIG. 6 illustrates an exemplary pre-communication process according to Embodiment 1.
Figure 7:
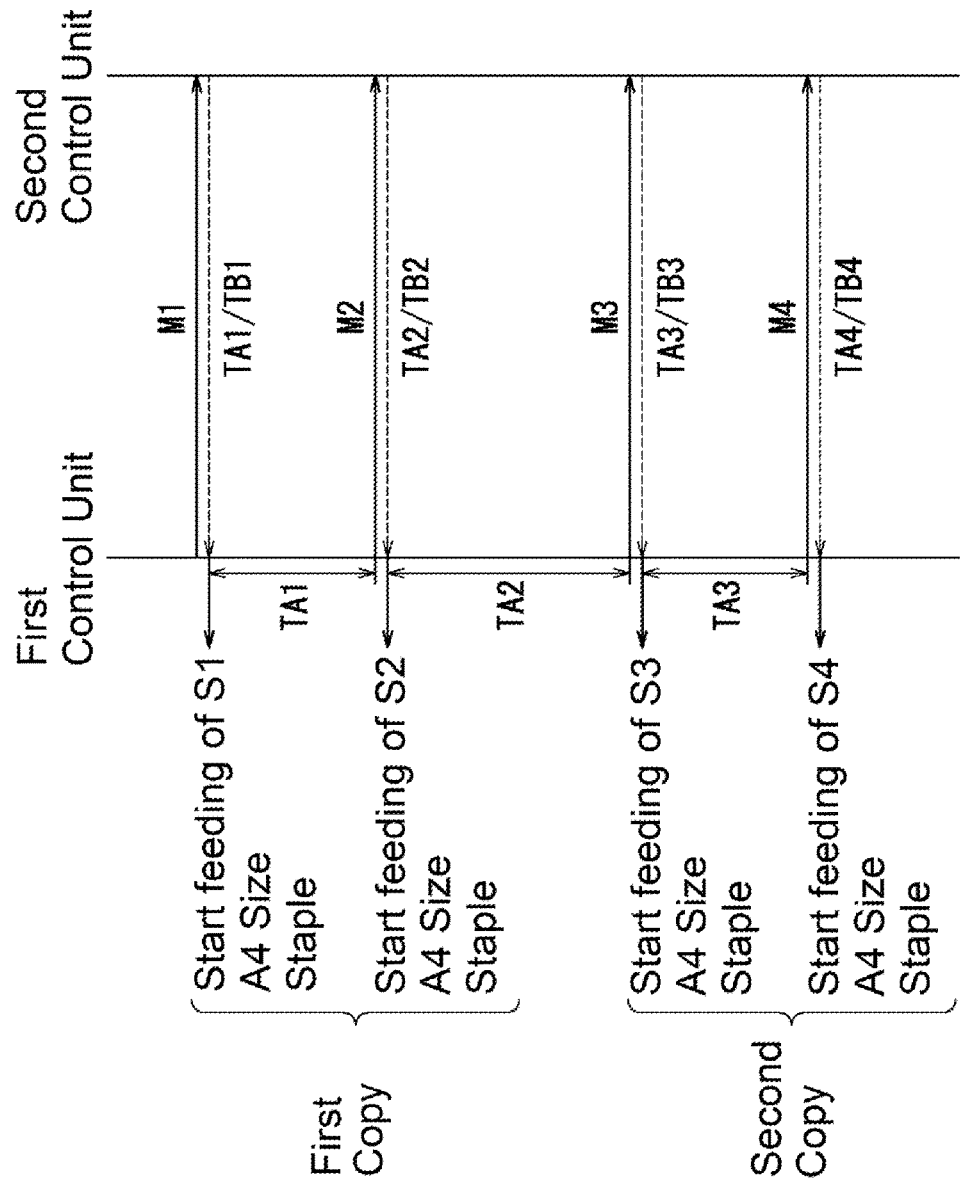
FIG. 7 illustrates a first other example of the pre-communication process according to Embodiment 1.
Figure 8:
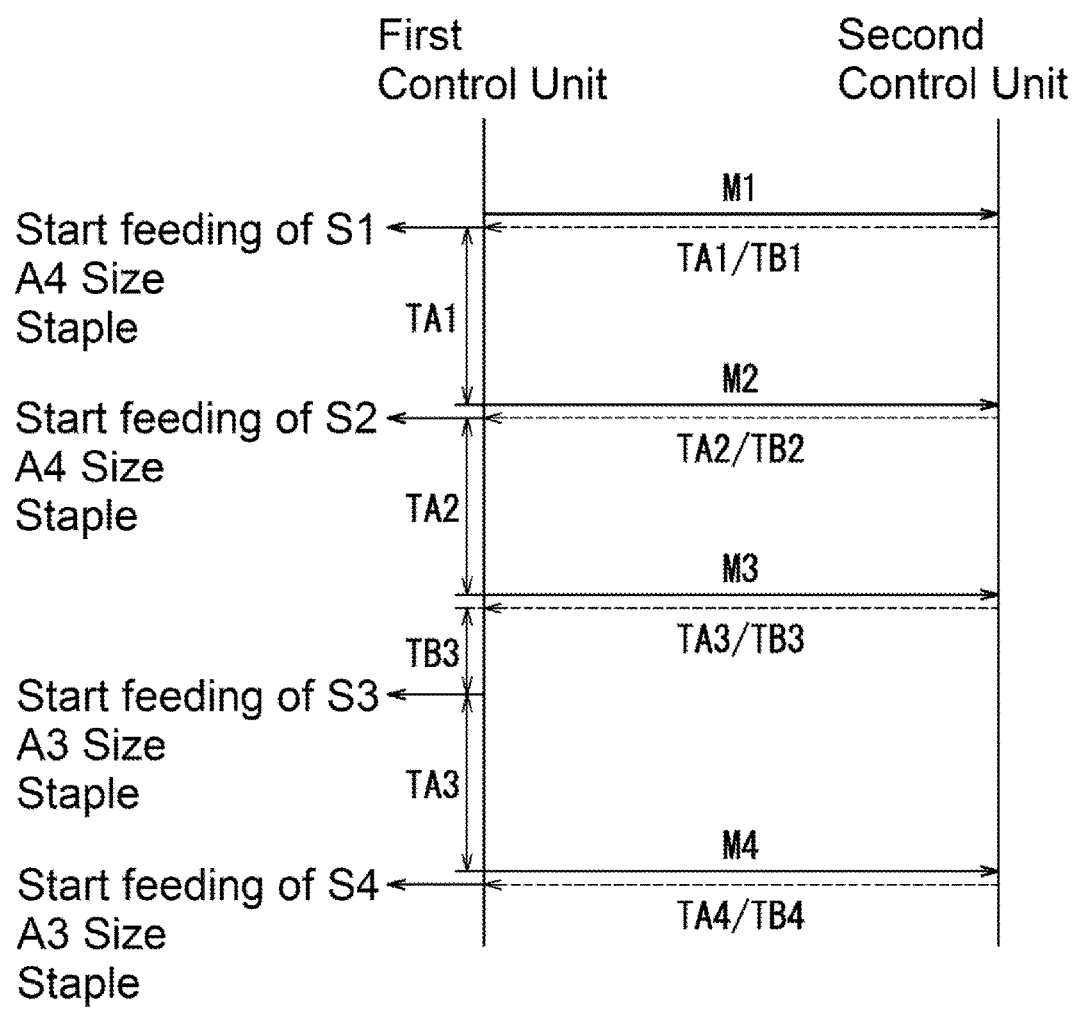
FIG. 8 illustrates a second other example of the pre-communication process according to Embodiment 1.

The following specifically describes the pre-communication process according to Embodiment 1 with reference to FIGS. 6 to 8.

The embodiment will be described such that, in FIGS. 6 to 8, among the plurality of sheets S that are the job execution targets, the sheet S fed first by the paper feeder 13 is defined as a "first sheet S1," and the sheets S fed second, third, and fourth are defined as a "second sheet S2," a "third sheet S3," and a "fourth sheet S4", respectively.

The embodiment will be described such that, in FIGS. 6 to 8, the attribute information M corresponding to the first sheet S1 is defined as "first attribute information M1," and the attribute information M corresponding to the second sheet S2, the third sheet S3, and the fourth sheet S4 is defined as "second attribute information M2," "third attribute information M3," and "fourth attribute information M4."

Further, the embodiment will be described such that, in FIGS. 6 to 8, the intercopy/intersheet time TA and the correction time TB corresponding to the first attribute information M1 are defined as a "first intercopy/intersheet time TA1" and a "first correction time TB1," the intercopy/intersheet time TA and the correction time TB corresponding to the second attribute information M2 are defined as a "second intercopy/intersheet time TA2" and a "second correction time TB2," the intercopy/intersheet time TA and the correction time TB corresponding to the third attribute information M3 are defined as a "third intercopy/intersheet time TA3" and a "third correction time TB3," and the intercopy/intersheet time TA and the correction time TB corresponding to the fourth attribute information M4 are defined as a "fourth intercopy/intersheet time TA4" and a "fourth correction time TB4." In this embodiment, the correction time TB corresponding to the first sheet S of each copy is "0" seconds.

First, the pre-communication process performed when the number of copies is one will be described with reference to FIG. 6.

FIG. 6 illustrates an exemplary pre-communication process according to Embodiment 1. For details, FIG. 6 illustrates the pre-communication process performed when accepting the job execution request indicating that "the staple process is performed on the bundle of the sheets S where four sheets S constitute one copy to make one copy."

In the example illustrated in FIG. 6, the first sheet S1 to the fourth sheet S4 are all sheets in A4 size. In other words, all the size information of the first sheet S1 to the fourth sheet S4 matches one another. The staple process is performed on all the first sheet S1 to the fourth sheet S4. In other words, all the postprocessing information of the first sheet S1 to the fourth sheet S4 matches one another.

As illustrated in FIG. 6, first, the first control unit 17 transmits the first attribute information M1 to the second control unit 27.

The second control unit 27 receives the first attribute information M1 to obtain the first intercopy/intersheet time TA1 and the first correction time TB1 based on the first attribute information M1. The second control unit 27 transmits the obtained first intercopy/intersheet time TA1 and first correction time TB1 to the first control unit 17.

As described above, the first correction time TB1 corresponding to the first sheet S (the first sheet S1) of each copy is "0" seconds. Accordingly, the first control unit 17 receives the first intercopy/intersheet time TA1 and the first correction time TB1 to cause the feed roller group 132 to start the feeding of the first sheet S1. Afterwards, the first control unit 17 waits until when the first intercopy/intersheet time TA1 has passed.

The first control unit 17 transmits the second attribute information M2 to the second control unit 27 after the first intercopy/intersheet time TA1 has passed from the start of the feeding of the first sheet S1.

The second control unit 27 receives the second attribute information M2 to obtain the second intercopy/intersheet time TA2 and the second correction time TB2 based on the second attribute information M2. The second control unit 27 transmits the obtained second intercopy/intersheet time TA2 and second correction time TB2 to the first control unit 17.

In the example illustrated in FIG. 6, the size information and the postprocessing information corresponding to the second sheet S2 match the size information and the postprocessing information corresponding to the first sheet S1. Accordingly, the second correction time TB2 is "0" seconds. Accordingly, the first control unit 17 receives the second intercopy/intersheet time TA2 and the second correction time TB2 to cause the feed roller group 132 to start the feeding of the second sheet S2. Afterwards, the first control unit 17 waits until when the second intercopy/intersheet time TA2 has passed.

The first control unit 17 transmits the third attribute information M3 to the second control unit 27 after the second intercopy/intersheet time TA2 has passed from the start of the feeding of the second sheet S2. The second control unit 27 receives the third attribute information M3 to obtain the third intercopy/intersheet time TA3 and the third correction time TB3 based on the third attribute information M3. The second control unit 27 transmits the obtained third intercopy/intersheet time TA3 and third correction time TB3 to the first control unit 17. In the example illustrated in FIG. 6, the size information and the postprocessing information corresponding to the third sheet S3 match the size information and the postprocessing information corresponding to the second sheet S2. In view of this, the third correction time TB3 is "0" seconds. Accordingly, the first control unit 17 receives the third intercopy/intersheet time TA3 and the third correction time TB3 to cause the feed roller group 132 to start the feeding of the third sheet S3. Afterwards, the first control unit 17 waits until when the third intercopy/intersheet time TA3 has passed.

The first control unit 17 transmits the fourth attribute information M4 to the second control unit 27 after the third intercopy/intersheet time TA3 has passed from the start of the feeding of the third sheet S3. The second control unit 27 receives the fourth attribute information M4 to obtain the fourth intercopy/intersheet time TA4 and the fourth correction time TB4 based on the fourth attribute information M4. The second control unit 27 transmits the obtained fourth intercopy/intersheet time TA4 and fourth correction time TB4 to the first control unit 17. In the example illustrated in FIG. 6, the size information and the postprocessing information corresponding to the fourth sheet S4 match the size information and the postprocessing information corresponding to the third sheet S3. In view of this, the fourth correction time TB4 is "0" seconds. Accordingly, the first control unit 17 receives the fourth intercopy/intersheet time TA4 and the fourth correction time TB4 to cause the feed roller group 132 to start the feeding of the fourth sheet S4.

The following describes the pre-communication process performed when the number of copies are plural with reference to FIG. 7.

FIG. 7 illustrates a first other example of the pre-communication process according to Embodiment 1. For details, FIG. 7 illustrates the pre-communication process performed when accepting the job execution request indicating that "the staple process is performed on the bundle of the sheets S where two sheets S constitute one copy to make two copies."

In the example illustrated in FIG. 7, a first copy is constituted of the first sheet S1 and the second sheet S2, and a second copy is constituted of the third sheet S3 and the fourth sheet S4. The first sheet S1 to the fourth sheet S4 are all sheets in A4 size. In other words, all the size information of the first sheet S1 to the fourth sheet S4 matches one another. The staple process is performed on all the first sheet S1 to the fourth sheet S4. In other words, all the postprocessing information of the first sheet S1 to the fourth sheet S4 matches one another. Accordingly, the first correction time TB1 to the fourth correction time TB4 are each "0" seconds.

In the example illustrated in FIG. 7, the second sheet S2 is the last sheet S of the first copy. In view of this, the second intercopy/intersheet time TA2 corresponding to the second sheet S2 indicates a time to perform the postprocessing. Specifically, the second intercopy/intersheet time TA2 indicates a total time of the pulling-in time, the matching processing time, the staple processing time, and the discharge processing time. Accordingly, the second intercopy/intersheet time TA2 illustrated in FIG. 7 is longer than the second intercopy/intersheet time TA2 illustrated in FIG. 6.

The following describes the pre-communication process performed when the number of copies of the job is one and the sheets S having different sizes mix with reference to FIG. 8.

FIG. 8 illustrates a second other example of the pre-communication process according to Embodiment 1. For details, FIG. 8 illustrates the pre-communication process performed when accepting the job execution request indicating that "the staple process is performed on the sheet bundle where four sheets S having mixed sizes constitute one copy to make one copy."

In the example illustrated in FIG. 8, the staple process is performed on all the first sheet S1 to the fourth sheet S4. In other words, all the postprocessing information of the first sheet S1 to the fourth sheet S4 matches one another. On the other hand, the first sheet S1 and the second sheet S2 are sheets in A4 size, and the third sheet S3 and the fourth sheet S4 are sheets with A3 size. Accordingly, the size information corresponding to the second sheet S2 does not match the size information corresponding to the third sheet S3. As a result, the third correction time TB3 indicates a time longer than "0" seconds. Accordingly, the first control unit 17 receives the third intercopy/intersheet time TA3 and the third correction time TB3 to wait until when the third correction time TB3 has passed. The first control unit 17 causes the feed roller group 132 to start the feeding of the third sheet S3 after the third correction time TB3 has passed from the reception of the third intercopy/intersheet time TA3 and the third correction time TB3. Afterwards, the first control unit 17 waits until when the third intercopy/intersheet time TA3 has passed. The first control unit 17 transmits the fourth attribute information M4 to the second control unit 27 after the third intercopy/intersheet time TA3 has passed from the start of the feeding of the third sheet S3.

As described above, Embodiment 1 has been described. According to this embodiment, the first control unit 17 transmits the attribute information M to the second control unit 27 before feeding the sheet S from the cassette 131. The attribute information M is information necessary for the second control unit 27 to obtain the intercopy/intersheet time TA and the correction time TB. The second control unit 27 receives the attribute information M to obtain the intercopy/intersheet time TA and the correction time TB, and then, transmits the intercopy/intersheet time TA and the correction time TB to the first control unit 17. The first control unit 17 causes the paper feeder 13 to feed the sheet S at a timing corresponding to the correction time TB transmitted from the second control unit 27. The first control unit 17 transmits the attribute information M corresponding to the sheet S to be fed next to the second control unit 27 at a timing corresponding to the intercopy/intersheet time TA transmitted from the second control unit 27. Accordingly, the control program executed by the first control unit 17 of the image forming apparatus 1, even in a case where performance of the postprocessing device 2 to be connected is changed, need not to be changed corresponding to this.

While in this embodiment the case where the sheet S is fed from the cassette 131 has been described as an example, the position from which the sheet S is fed is not limited to the cassette 131. For example, the sheet S may be fed from a manual bypass tray included in the image forming apparatus 1.

In this embodiment, when the attribute information M corresponding to the preceding sheet S matches the attribute information M corresponding to the following sheet S, the first control unit 17 has determined that the correction time TB is "0" seconds. However, the correction time TB is not limited to "0" seconds. The correction time TB may be, for example, "0.1" seconds.

Embodiment 2

Subsequently, a description will be given of an image forming system 100 according to Embodiment 2 with reference to FIGS. 1 to 4, and 9. In Embodiment 2, the number of transmission of the attribute information M is different from that in Embodiment 1.

In Embodiment 2, the first control unit 17 determines whether the attribute information M corresponding to the preceding sheet S matches the attribute information M corresponding to the following sheet S or not. The first control unit 17 determines whether transmitting the attribute information M to the second control unit 27 or not corresponding to a determination result. Specifically, the first control unit 17 transmits the attribute information M corresponding to the following sheet S to the second control unit 27 when it is determined that the attribute information M corresponding to the preceding sheet S does not match the attribute information M corresponding to the following sheet S. On the other hand, the first control unit 17 does not transmit the attribute information M corresponding to the following sheet S to the second control unit 27 when it is determined that the attribute information M corresponding to the preceding sheet S matches the attribute information M corresponding to the following sheet S. In this case, the second control unit 27 does not receive the attribute information M, thus not transmitting the intercopy/intersheet time TA and the correction time TB to the first control unit 17. Accordingly, a volume of communication between the image forming apparatus 1 and the postprocessing device 2 can be reduced.

A description will be given of a pre-communication process according to Embodiment 2 with reference to FIGS. 4, 8, and 9.

Figure 9:
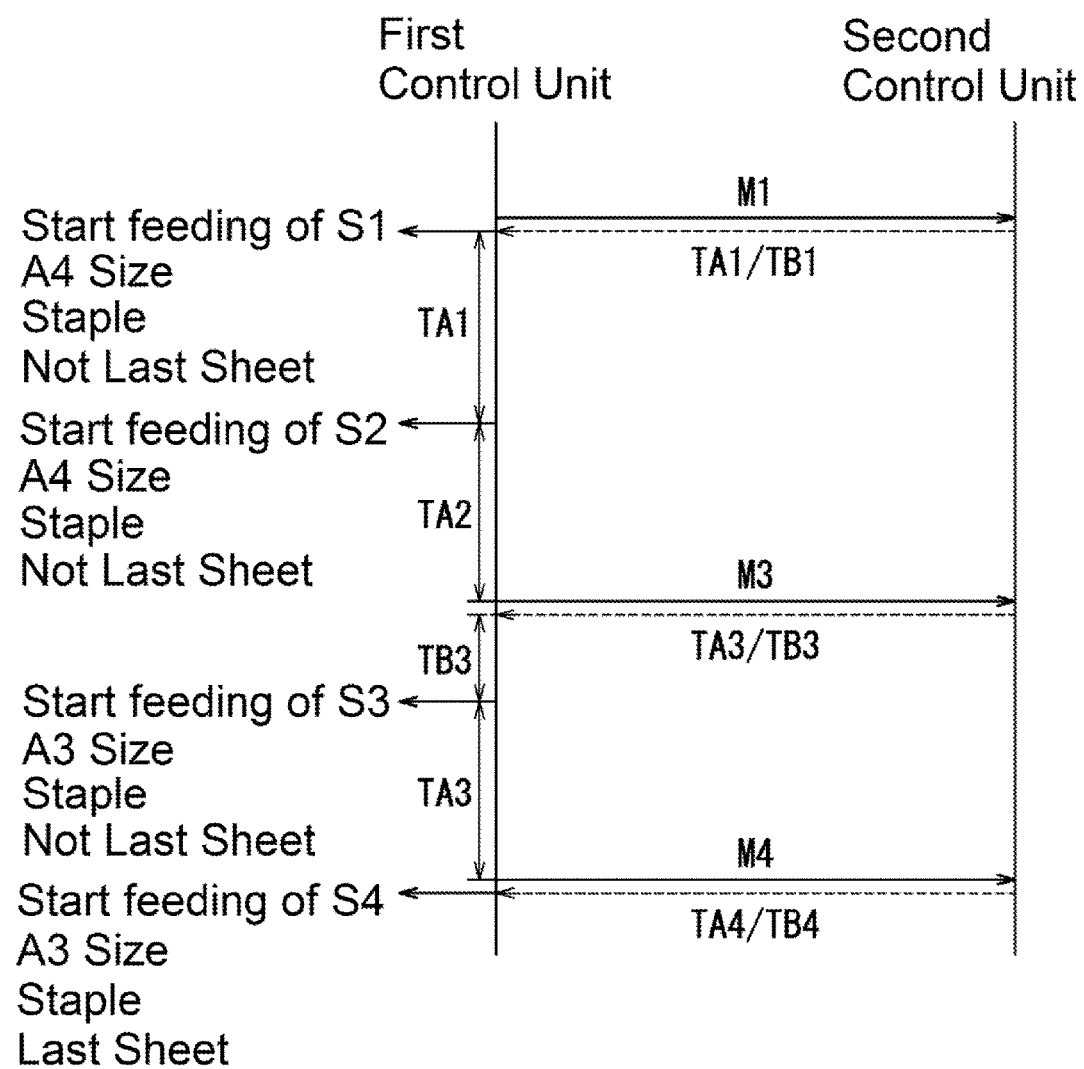
FIG. 9 illustrates an exemplary pre-communication process according to Embodiment 2 of the disclosure.

FIG. 9 illustrates an exemplary pre-communication process according to Embodiment 2. For details, FIG. 9 illustrates the pre-communication process performed when accepting the job identical to the job caused to perform the pre-communication process described with reference to FIG. 8.

As described with reference to FIG. 8, the size information and the postprocessing information corresponding to the second sheet S2 match the size information and the postprocessing information corresponding to the first sheet S1. The first sheet S1 and the second sheet S2 are both not the last sheet. Accordingly, the last sheet information corresponding to the second sheet S2 matches the last sheet information corresponding to the first sheet S1. In other words, the first attribute information M1 matches the second attribute information M2. Accordingly, in the example illustrated in FIG. 9, the first control unit 17 does not transmit the attribute information M corresponding to the second sheet S2 (the second attribute information M2 illustrated in FIG. 8) to the second control unit 27.

The second control unit 27 does not obtain the intercopy/intersheet time TA and the correction time TB corresponding to the second sheet S2 since the second attribute information M2 is not transmitted from the first control unit 17. Accordingly, the second control unit 27 does not transmit the intercopy/intersheet time TA and the correction time TB corresponding to the second sheet S2 (the second intercopy/intersheet time TA2 and the second correction time TB2 illustrated in FIG. 8) to the first control unit 17. As a result, the volume of communication between the image forming apparatus 1 and the postprocessing device 2 is reduced.

Since the fourth sheet S4 is the last sheet, fourth last sheet information corresponding to the fourth sheet S4 does not match the last sheet information corresponding to the third sheet S3. Accordingly, the first control unit 17 transmits the fourth attribute information M4 corresponding to the fourth sheet S4 to the second control unit 27.

As described above, Embodiment 2 has been described. With Embodiment 2, the volume of communication between the image forming apparatus 1 and the postprocessing device 2 is reduced.

While in the embodiments of the disclosure, for example, the case where the disclosure is applied to the image forming apparatus that forms the image on the sheet S in the electrophotographic method has been described, the disclosure is not limited to this. For example, the disclosure is also applicable to an image forming apparatus in an inkjet printing method.

The disclosure is effective for the image forming apparatus to where the postprocessing device is connected.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. An image forming system comprising:
an image forming apparatus that is configured to perform an image formation process to form images on a plurality of sheets based on an execution request of a job; and
a postprocessing device connected to the image forming apparatus, the postprocessing device is configured to receive the plurality of sheets conveyed one by one from the image forming apparatus; wherein
the image forming apparatus includes
a first communication unit that communicates with the postprocessing device,
a paper feeder that is configured to house the plurality of sheets to feed the housed plurality of sheets one by one, and
a first controller that controls operation of the first communication unit and the paper feeder;
the postprocessing device includes
a second communication unit that communicates with the first communication unit,
a postprocessing unit that is configured to perform postprocessing on the plurality of sheets, and
a second controller that controls operation of the second communication unit and the postprocessing unit;
the second controller obtains a first time to perform the postprocessing and a second time to transition to a performable state configured to perform the postprocessing;
the first controller obtains attribute information necessary for the second controller to obtain the first time and the second time;
the first controller transmits the attribute information corresponding to a first feeding sheet to the second communication unit via the first communication unit, the first feeding sheet being the sheet as a feed target of the paper feeder;
when the second communication unit receives the attribute information, the second controller transmits information indicating the first time and the second time to the first communication unit via the second communication unit;

the first controller is configured to cause the paper feeder to feed the first feeding sheet after the second time has passed from the reception of the information indicating the first time and the second time by the first communication unit; and the first controller is configured to transmit the attribute information corresponding to a second feeding sheet to the second communication unit via the first communication unit after the first time has passed from the feeding of the first feeding sheet, the second feeding sheet being the sheet to be fed by the paper feeder next to the first feeding sheet.

2. The image forming system according to claim 1, wherein:

the first controller determines whether the attribute information corresponding to the first feeding sheet matches the attribute information corresponding to the second feeding sheet or not; and the first controller transmits the attribute information corresponding to the second feeding sheet to the second communication unit via the first communication unit when the first controller has determined that the attribute information corresponding to the first feeding sheet does not match the attribute information corresponding to the second feeding sheet.

3. The image forming system according to claim 1, wherein the attribute information includes size information indicating a size of the sheet.

4. The image forming system according to claim 1, wherein the attribute information includes postprocessing information indicating a type of the postprocessing.

5. The image forming system according to claim 1, wherein when a count of copies made by the job is plural, the attribute information includes information indicating whether the sheet is a last sheet among the plurality of sheets included in each of the plurality of copies or not.

6. The image forming system according to claim 1, wherein:

the attribute information includes size information indicating a size of the sheet and postprocessing information indicating a type of the postprocessing;

the second controller determines whether the size information and the postprocessing information corresponding to the first feeding sheet match the size information and the postprocessing information corresponding to the second feeding sheet or not; and the second controller determines that the second time is 0 when the second controller has determined that the size information and the postprocessing information corresponding to the first feeding sheet match the size information and the postprocessing information corresponding to the second feeding sheet.

7. The image forming system according to claim 1, wherein:

the image forming apparatus further includes an input apparatus to which information is input;

the attribute information is input to the input apparatus at a time of the job execution request; and the first controller obtains the attribute information from the input apparatus.

8. An image forming apparatus comprising:

an image forming unit that is configured to perform an image formation process to form images on a plurality of sheets based on an execution request of a job;

a paper feeder that is configured to house the plurality of sheets to feed the housed plurality of sheets one by one;

a communication unit that is configured to communicate with the postprocessing device; and a controller that controls operation of the paper feeder, the image forming unit, and the communication unit; wherein the controller obtains attribute information necessary to obtain a first time for the postprocessing device to perform postprocessing and a second time for the postprocessing device to transition to a performable state configured to perform the postprocessing, the controller is configured to transmit the attribute information corresponding to a first feeding sheet to the postprocessing device via the communication unit, the first feeding sheet being the sheet as a feed target of the paper feeder;

after the communication unit receives information indicating the first time and the second time, the controller is configured to cause the paper feeder to feed the first feeding sheet after the second time has passed from the reception of the information indicating the first time and the second time by the communication unit; and the controller is configured to transmit the attribute information corresponding to a second feeding sheet to the postprocessing device via the communication unit after the first time has passed from the feeding of the first feeding sheet, the second feeding sheet being the sheet to be fed by the paper feeder next to the first feeding sheet.

9. A postprocessing device comprising:

a postprocessing unit that is configured to perform postprocessing on sheets conveyed from an image forming apparatus;

a communication unit that is configured to communicate with the image forming apparatus; and a controller that controls operation of the postprocessing unit and the communication unit; wherein the controller obtains a first time to perform the postprocessing and a second time to transition to a performable state configured to perform the postprocessing, the communication unit is configured to receive attribute information necessary to obtain the first time and the second time from the image forming apparatus, after the communication unit receives the attribute information, the controller is configured to transmit information indicating the first time and the second time to the image forming apparatus via the communication unit, the image forming apparatus feeding a first feeding sheet after the second time has passed from a reception of the information indicating the first time and the second time by the image forming apparatus, the first feeding sheet being the sheet as a feed target in the image forming apparatus, and the communication unit is configured to receive the attribute information corresponding to a second feeding sheet from the image forming apparatus after the first time has passed from the feeding of the first feeding sheet, the second feeding sheet being the sheet to be fed next to the first feeding sheet in the image forming apparatus.

* * * * *